July 15, 1969  C. P. SPOELHOF  3,455,223
WIDE-ANGLE OPTICAL SYSTEM
Filed May 6, 1965  2 Sheets-Sheet 2
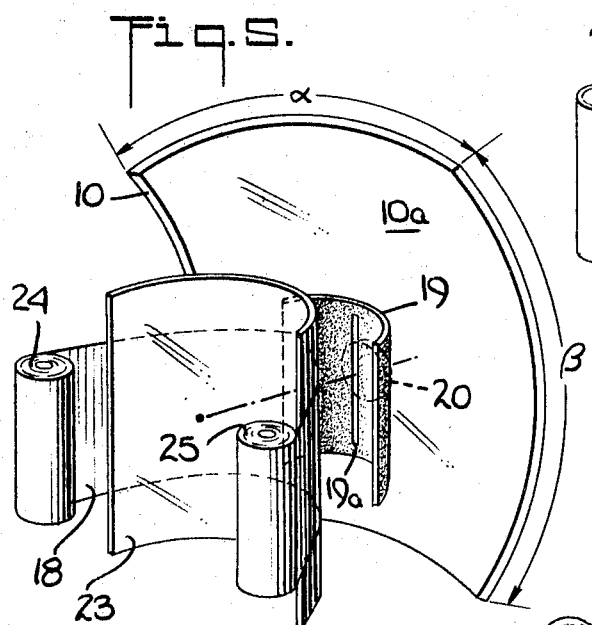
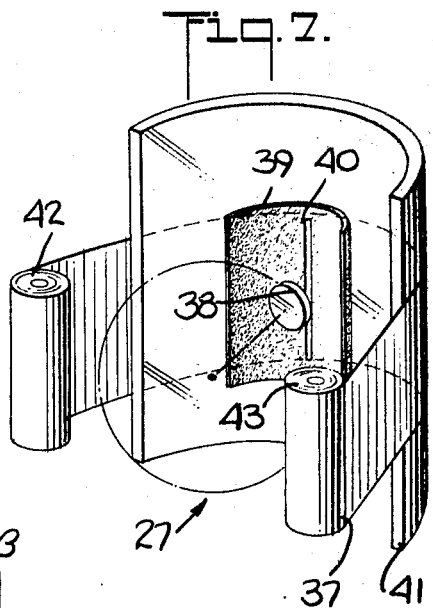
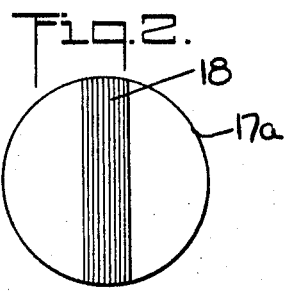
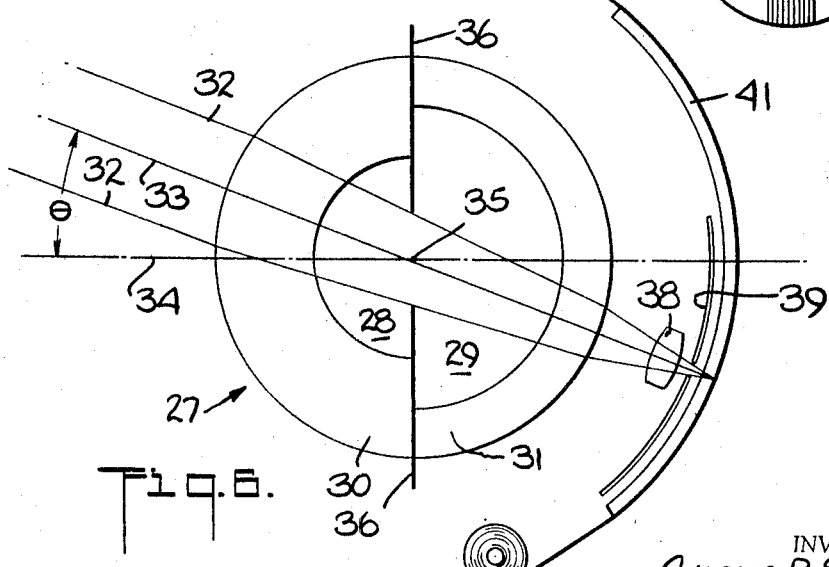
INVENTOR.
CHARLES P. SPOELHOF
BY R. Frank Smith
F. M. Emerson Holmes
ATTORNEYS

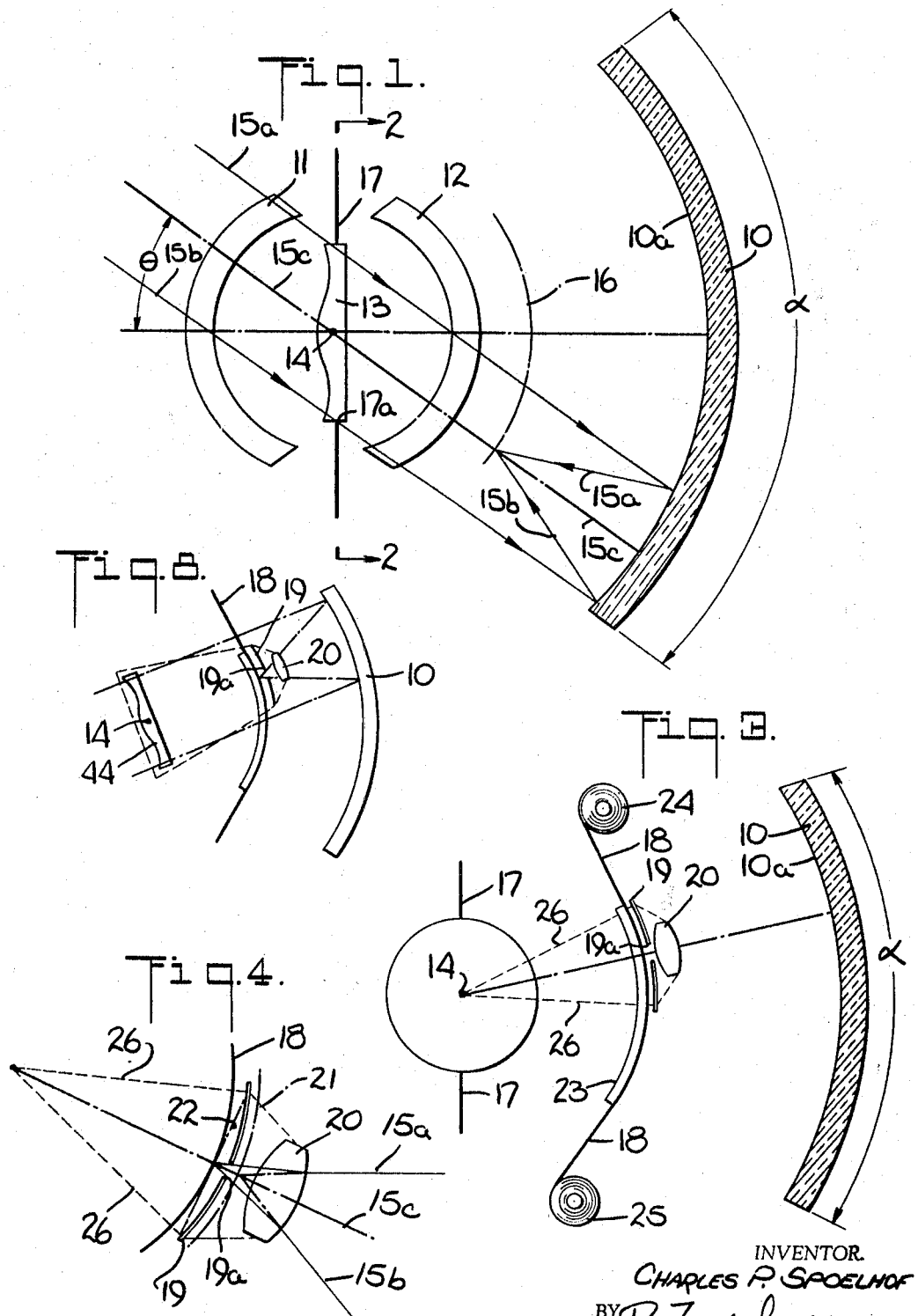

United States Patent Office 3,455,223
Patented July 15, 1969

3,455,223
WIDE-ANGLE OPTICAL SYSTEM
Charles P. Spoelhof, Rochester, N.Y., assignor to Eastman Kodak Company, Rochester, N.Y., a corporation of New Jersey
Filed May 6, 1965, Ser. No. 453,593
Int. Cl. G03b *37/00;* G02b *23/02*
U.S. Cl. 95—16                                       33 Claims

ABSTRACT OF THE DISCLOSURE

An optical system having an objective for forming a first image with a curved field and a field flattening lens which scans the first image to form a second image with a field substantially flat in one direction, so that a record of the second image having a straight line dimension can be made. By means of this invention a curved image can be recorded on a record which can be conveniently flattened into a flat form.

---

The invention relates to an optical system for producing an image of a wide field of view, and more in particular, to a system for producing an image of a wide field of view on a cylindrical focal surface.

Optical systems requiring a wide field of view are often necessary in photography. A relatively recent example of an optical system having a wide field of view is the Baker-Nunn camera for tracking artificial earth satellites. This camera includes a fast, wide field Schmidt optical system. The Schmidt and Maksutov types of wide field system, as well as the Baker-Nunn camera, employ a catadioptric optical system in which the concave reflecting surface serves as the objective. In the single concave-mirror system, the single mirror receiving the incoming beam of radiation forms an image on a focal surface disposed in the incoming beam. In the Schmidt system, correction is made for the spherical aberration of the spherical reflecting mirror by inserting a corrector plate or figured lens in the path of the light rays before reflection from the mirror. The complicated aspherical surface of the Schmidt corrector plate can be avoided by the Maksutov type of catadioptric system in which a thick meniscus lens is used to correct for the spherical aberration of the mirror. Here again, the meniscus lens is placed in the path of the rays directed to the mirror. Since the light, which is ultimately reflected from the mirror in a single mirror catadioptric system has a spherical field, the image formed is spherical and consequently requires a spherical focal surface. As a result, when a single mirror catadioptric system is used as a camera, the photographic film must be made to conform to the spherical focal surface during exposure. This immediately presents a difficulty since photographic film is conventionally in the form of a flat sheet. Therefore, to place it upon a spherical focal surface, the film must be stretched or otherwise elastically deformed to correspond to the spherical focal surface in order to enable the focused image to be recorded upon it. In extreme cases, the film must be inelastically deformed. It is obvious that the ultimate print of the photographic film should for all practical purposes be in a plane or flat form. In order to obtain this from a film inelastically deformed to match a spherical focal surface, it is necessary to print the film, with equipment capable of producing a plane image from the spherical image. In addition, the requirement that the film conform to a spherical focal surface makes it difficult to use a strip of film which is the most convenient form for the taking of a sequence of photographs. This is particularly true if the field width and film strip width are maximized.

It is therefore one of the objects of the invention to provide an optical system which has a wide field of view and which is capable of correcting for spherical field curvature.

It is another object of the invention to provide an optical system having a wide field of view and a cylindrical focal surface.

It is still another object of the invention to provide an optical system which has a wide field of view and which can form an image on a record having a strip form.

It is an additional object of the invention to provide a wide field of view optical system in which the image on the focal surface is formed by scanning.

It is a further object of the invention to correct for field curvature in a wide angle catadioptric optical system.

It is also an object of the invention to correct for field curvature in a wide angle refractive optical system.

In one embodiment of the optical system of the invention, there is included means for focusing radiant energy to form an image having a curved field. There is further included means for converting a portion of the curved field image into an additional image which has a substantially flat field. An example of the converting means is a field flattening lens. The additional image is substantially parallel to a plane which is tangential to the curved-field image. The system also includes means for moving the converting means in order to scan the additional image formed thereby along a cylindrical focal surface which is substantially parallel to the curvature of the image. In this way a cylindrical record is formed at the focal surface, and due to its cylindrical form, the record can be conveniently flattened in order to provide a record in the flat form. Furthermore, there is provided a field aperture adjacent to the image converting means limiting the passing of radiant energy from the additional flat image to the cylindrically curved record. As a result, only the portion of the image that is sufficiently within focus is exposed to the record.

In another embodiment of the invention the optical system includes a curved mirror for focusing radiant energy to form an image having a curved field.

In an additional embodiment of the invention, the optical system includes a refractive lens system for focusing radiant energy to form an image having a curved field.

In still a further embodiment of the invention the wide angle optical system with the scanning field flattening arrangement is employed in a camera adapted to record on a strip of film.

Other objects and advantages of the invention will become apparent from the following drawings in which:

FIG. 1 is a section view of the optical system with a diagrammatic representation showing marginal light rays passing through a catadioptric lens which includes a concave spherical mirror and corrector lens elements.

FIG. 2 is a view taken along reference plane 2—2 in FIG. 1 showing the obstruction of the film to the aperture of the optical system.

FIG. 3 shows an embodiment of the invention in which the corrector lenses is represented as a sphere at the aperture and showing a field flattening lens and focal plane shutter which can be scanned with respect to a strip of film in order to apply an image reflector from a concave spherical mirror to the film.

FIG. 4 is fragmentary horizontal section view of the system of FIG. 5 showing the positioning of the field flattening lens with respect to the focal plane shutter and the image reflected by the mirror having substantially spherical field.

FIG. 5 is a fragmentary perspective view of the camera of the invention in which light is reflected from a concave spherical mirror through a field flattening lens and the slit of a focal plane shutter onto film positioned in the form of a cylindrical surface.

FIG. 6 is a horizontal section view showing an embodiment of the camera of the invention having a "ball lens" for directing light through a field flattening lens positioned adjacent to a strip of film disposed about a substantially cylindrical focal surface.

FIG. 7 is a fragmentary perspective view of an embodiment of the camera of the invention which employs a ball objective lens for directing light through a slit onto a strip of film disposed about a cylindrical supporting surface.

FIG. 8 is a fragmentary horizontal perspective view of another embodiment of the camera of the invention which includes a rotating aspheric corrector lens.

A portion of the optical system of the invention as shown in FIG. 1 includes means for focusing radiant energy to form an image or an objective having a concave spherical mirror 10 which receives radiant energy, such as visible light, through meniscus lenses or shells 11 and 12 and corrector plate or figured lens 13. Light reflected by surface 10a of first-surface mirror 10 can have spherical aberration. This condition can be substantially eliminated by the use of shells 11 and 12 and corrector plate 13. Shells 11 and 12 are substantially centered about point 14 through which the center of corrector plate 13 extends. Thus, point 14 becomes a point of symmetry for lenses 11 and 12 and corrector plate 13. Mirror 10 in conjunction with shells 11 and 12 and corrector plate 13 forms an objective or means for focusing radiant energy to form an image having a curved field.

As shown in FIG. 1, marginal light rays 15a and b emitted from a common point on a distant object (not shown) pass through the objective substantially parallel to one another and with respect to point symmetry 14. Upon being reflected by first surface 10a of the mirror, the marginal rays are focused at a point along focal surface 16. Thus concave spherical first surface 10a of mirror 10 forms an image at focal surface 16 which has a curved or spherical field.

Where the objective of FIG. 1 is to be employed in a camera device, it can be seen that to mount the film at focal surface 16 would require that the film be deformed from a substantially flat sheet into a spherical surface. If a large sheet of film is disposed at focal surface 16, it can seriously obstruct the incoming light such as shown by marginal rays 15a and b and central ray 15c.

Diaphragm 17 disposed about the corrector plate 13 serves as a stop for any light rays beyond marginal rays 15a and b. The problem of a large sheet of photographic film obstructing the incoming beam at focal surface 16 can be reduced by employing an elongated image which can apply light to an elongated recording material such as a strip of film 18. As shown in FIG. 2, if a strip of film is disposed vertically along focal surface 16 as shown in FIG. 1, the film would present a bar-like obstruction extending across aperture 17a formed in diaphragm 17. Thus, the light can pass through the shells and toward mirror 10 by passing to either side of film 18 as shown in FIG. 2. In accordance with this arrangement, the field of view of the objective of FIG. 1 is made as large as the aperture 17 permits in one direction, that is in a direction extending perpendicular to the plane of the surface of the paper. In the other direction, that is vertically along the surface of the drawing, the length of the field is limited by the degree to which shells 11 and 12 and corrector plate 13 have symmetry about the common center at point 14. The illumination transmitted by shells 11 and 12 and corrector plate 13 varies as the cosine of the angle $\theta$ and becomes zero when $\theta$ equals 90°. In practice, the length of the angular field of view can approach a 180° full angle in a substantially symmetrical design. The size of the mirror can become prohibitively large when a large focal length is required, but the limitation on the size of the mirror is made less severe where the mirror need be extensive in only one direction.

As shown in FIG. 3 of the drawings, the optical system of the invention includes means for converting the radiant energy of a portion of the curved field into an additional image having a substantially flat field. Field flattening lens 20 can serve as the image converting means. Thus field flattening lens 20 can flatten a portion of the field reflected by mirror 10 locally and thereby convert it from spherical surface 21 into flat plane 22 as shown in FIG. 4. Thus, without lens 20, the spherical field reflected by the mirror would be focused at spherical focal surface 21 as shown in FIG. 4. Due to the correcting action of lens 20, however, the rays reflected from the mirror are focused at plane 22, that is an image having a flat field which is parallel to a plane tangential to focal surface 21.

Lens 20 can be a multiple element lens for achromatization and to gain enough degrees of freedom for good optical correction. Since the record or film 18 is preferably in strip form, and since the additional image is in focus only along a line on the cylindrical film, the image to be transmitted by lens 20 toward the film is limited to a rectangular form, that is a rectangle having its greater axis extending at right angles to the paper in FIGS. 3 and 4. Consequently, aperture 19a in shutter 19 is in the form of a rectangular opening or slit. As a result of this construction, the rectangular image passed through aperture 19a and applied to film 18 is one having a flat field and extending across the width of the film.

From FIGS. 3 and 4 it can be seen that rotation of lens 20 along with aperture 19a with respect to the focal surface along which film 18 extends will result in the narrow rectangular images being scanned along the surface of the record or film. Since aperture 19a restricts the rays which are not in focus, the radiant energy passing through the aperture is in the form of a line which is in focus across the width of the film. When such a line is scanned about point 14, the line generates a cylindrical path or focal surface. Consequently, the focal surface for the radiant energy or light being focused by the slit is a cylindrical form. To maintain the film along a cylindrical focal surface, the camera of the invention, as shown in FIGS. 1–4, is provided with cylindrical platen 23 and the film is maintained taut with respect to the platen by being tensioned between spools 24 and 25.

Shutter 19 having aperture 19a can be pivotally mounted by supports 26 which rotate about a pivotal axis extending through point of symmetry 14. Lens 20 as schematically shown in FIGS. 3 and 4, is mounted, as represented by dash lines, to supports 26 so that the lens moves with the diaphragm in the manner of a focal plane shutter. Lens 20 serves as a field flattening lens for making the optical correction which enables the light to be focused along a cylindrical focal surface. As shown in FIG. 4, the film can be exposed as lens 20 and aperture 19a are moved upwardly with the film being held stationary against cylindrical platen 23. At the completion of the exposure the film, the lens, and the shutter can be moved together downwardly in order to recycle the camera and prepare for the exposure of the next frame of the film. During the step of recycling, the slit can be covered or capped or, in the alternative, be allowed to remain open and thereby provide an over-exposed narrow line between the frames exposed on the film.

Since field flattening lens 20 has optical power and has a small but finite separation from the image having the spherical field, the focal length of the objective including mirror 10, shells 11 and 12, and corrector plate 13 is modified by the presence of the field flattening lens, Image scale depends upon focal length and the image will move with respect to the film if the focal length is not identically equal to the radius of the cylinder of the focal surface, that is cylindrical platen 23. Consequently, the dimension and the refractive index of lens 20 are designed to make the distance from point of symmetry 14 to the focal surface of platen 23 equal to the focal length.

The construction of the optical system of FIGS. 3 and 4 is further shown in perspective in FIG. 5. In FIG. 5, aperture or slit 19a of shutter 19 is shown extending in a vertical direction. Consequently in order to produce an image having a sufficient field of view in the direction of the long axis of the slit, mirror 10 is provided with a sufficient dimension in the direction of the arc represented by β in FIG. 5. The remaining dimension of the mirror, which is identified by the symbol α in FIG. 5 is determined by the length of the film strip to be exposed and would generally require a greater dimension than β. The cylindrical film platen 23 serves to support the film along a cylindrical focal surface and provides convenient access to the continuous strand of film. Since the focal length is equal to the platen radius, it can be understood that the image does not move with respect to the film during the motion of the slit and field flattening lens along the film.

FIG. 8 shows another embodiment of the invention which includes the optical system FIG. 3, that is mirror 10, lens 20 and shutter 19 having aperture 19a. Similarly as in FIG. 3, film 18 is in strip form is maintained taut with respect to platen 23 by being tensioned between spools (not shown). In addition the embodiment of FIG. 8 includes aspheric corrector lens 44 which is adapted to rotate together with lens 20 and shutter 19 about point 14. In FIG. 8, dash lines 45 represent the mounting of aspheric corrector lens 44 together with shutter 19 and lens 20.

An advantage of the construction of FIG. 8 is that it enables the symmetry of corrector plate 44 with respect to point 14 to be precisely maintained as the corrector plate, shutter 19 and lens 20 are rotated about point 14 during scanning. In addition the variation in the illumination transmitted by the stationary corrector plate as the cosine of the angle θ is eliminated by the rotating corrector plate 14 of FIG. 8. Since symmetry can be maintained and the variation in illumination eliminated throughout the extent of the scan, the embodiment of FIG. 8 enables very large scan angles to be employed.

FIGS. 6 and 7 show an embodiment of the invention in which the objective is of the refractive type. Objective lens 27 is of the "ball type" and includes inner hemispherical elements 28 and 29 and meniscus lenses or shells 30 and 31 which receive hemispherical elements 28 and 29, respectively, in a mating arrangement. Marginal rays 32 of central ray 33 approach shell 30 at an angle θ to the central axis 34 of the lens and pass through point of symmetry 35. Diaphragm 36 extends through ball lens 27 in order to obstruct rays beyond marginal rays 32 which cannot be focused. Here the image width is not limited by the relative aperture as shown in FIG. 2 of the reflective objective embodiment of the invention, since film 37 does not obstruct the incoming bundle of rays. Instead, the film is supported along a cylindrical focal surface beyond the ball lens.

Similarly as in the reflective objective embodiment, the field flattening lens 38 in conjunction with shutter 39 having aperture or slit 40 forms a rectangular image having a flat field and having its long axis extending at right angles to the surface of the drawing of FIG. 6. Here the focal surface of the image formed by lens 38 in conjunction with diaphragm or focal plane shutter 39 is a concave cylindrical surface. Consequently it is necessary to support film 37 along this surface. This can be accomplished by the provision of cylindrical transparent platen 41 across which film 37 is stretched by means of spools 42 and 43. Any optical effect of the transparent platen can be included and thereby compensated for in the overall design of the ball lens and field flattening lens. The embodiment of the camera of FIG. 6 is further shown in perspective in FIG. 7. Similarly as in the embodiment of FIGS. 3 and 4, means are provided for rotating lens 38 and shutter 39 together about point of symmetry 35 so that the image of lens 38 which passes through slit or shutter 40 is applied to the cylindrical focal surface during the cycle of exposure. The return of the lens and shutter along with the winding of the film can be accomplished in a manner similar to that described with respect to the camera of the invention employing a reflective objective.

In accordance with the invention, there is provided a focal plane shutter arrangement with optical power for correction of field curvature along the slit of the shutter. The combination of the optical power and the focal plane shutter with a symmetrical lens enables the optical system to receive light over a wide field of view and therefore to be suitable for wide angle photography. Furthermore, the combination of the focal plane shutter, the field flattening lens and the symmetrical objective together with the cylindrical platen facilitate the handling and the transporting of the strip of film and simplify the maintenance of focus of the image upon the film since it is wrapped with respect to a cylindrical surface of platen. In addition, the designing of the focal length to equal the platen radius insures that the image does not move with respect to the film during the motion of the slit and field flattening lens along the film, and therefore a series of images can be laid down beside one another in order to form a wide angle image.

What is claimed:

1. An optical system comprising means for focusing radiant energy to form a first image having a curved field, means for converting the radiant energy of a portion of the curved field into an additional image having a substantially flat field and being substantially parallel to a plane tangential to the first image, and means for moving said converting means to convert other portions of the curved filed into additional images having substantially flat fields and being substantially parallel to planes tangential to the first image, said additional images defining a curved focal surface, flat in one direction, whereby a record of the additional images having a straight line dimension can be made.

2. An optical system comprising an objective for focusing radiant energy to form a first image having a curved field, means for converting the radiant energy of a portion of the curved field into a portion of a curved scanning image, said portion having a substantially flat field and being substantially parallel to a plane tangential to the first image, and means for moving said converting means to scan the curved field and form the curved scanning image, said curved scanning image being flat in one direction, whereby a record of the scanning image having a straight line dimension can be made.

3. An optical system comprising means for focusing radiant energy to form an image having a curved field, means for flattening a portion of the curved field to form an additional image having a substantially flat field, the additional image being substantially parallel to a plane tangential to the image, and means for moving said field flattening means to scan each of the additional images formed thereby along a focal surface extending along a line substantially parallel to the curvature of the image, whereby a record of the additional images having a straight line dimension can be made.

4. An optical system comprising means for focusing radiant energy to form a first image having a curved field, a field flattening lens for converting the radiant energy of a portion of the curved field into an additional image having a substantially flat field and being substantially parallel to a plane tangential to the first image, and means for moving said field flattening lens to scan the curved field and continuously form a curved scanning image extending along a line parallel to the curvature of the first image, whereby a record of the scanning image having a straight line dimension can be made.

5. An optical system comprising an objective lens for focusing radiant energy to form a first image having a curved field, means for flattening a portion of the curved field to form an additional image having a substantially flat field and being substantially parallel to a plane tangential to the first image, and means for moving said field flattening means to scan the curved field and continuously form additional images defining a curved scanning image substantially flat in one direction, whereby a record of the scanning image having a straight line dimension can be made.

6. An optical system comprising an objective including a curved mirror for focusing radiant energy to form a first image having a curved field, means for converting the radiant energy of a portion of the radiant energy being focused by said mirror into an additional image having a substantially flat field and being substantially parallel to a plane tangential to the first image, and means for moving said converting means to scan the curved field and continuously form a curved scanning image defining a focal surface extending along a line substantially parallel to the curvature of the first image, whereby a record of the scanning image having a straight line dimension can be made.

7. An optical system comprising means for focusing radiant energy to form a first image having a substantially spherical field, means for converting the radiant energy of a portion of the spherical field into an additional image having a substantially flat field and being substantially parallel to a plane tangential to the first image, and means for moving said converting means to scan the spherical field and continuously form a scanning image along a cylindrical focal surface having a central axis that passes through the center of curvature of the first image, whereby a cylindrical record of the additional images can be made.

8. An optical system comprising means for focusing radiant energy to form a first image having a curved field, means for converting the radiant energy of a portion of the curved field into an additional image having a substantially flat field and being substantially parallel to a plane tangential to the a first image, means adjacent said converting means for rejecting a portion of the radiant energy being focused by said converting means to improve the focus of the additional image, and means for moving said converting means and said rejecting means to scan the curved field and continuously form a curved scanning image extending along a line substantially parallel to the curvature of the first image, whereby a record of the scanning image having a straight line dimension can be made.

9. An optical system comprising means for focusing radiant energy to form a first image having a curved field, means for converting the radiant energy of a portion of the curved field into an additional image having a substantially flat field and being parallel to a plane tangential to the first image, a shutter adjacent said converting means and containing a slit opening for passing a portion of the radiant energy being focused by said converting means and for rejecting the remaining portion of the radiant energy to improve the focus of the additional image, and means for moving said converting means and said shutter to scan the curved field and continuously form additional images defining a curved focal surface extending along a line parallel to the curvature of the first image, the longitudinal axis of said slit opening extending at right angles to the line parallel to the curvature of the first image, whereby a record of the additional images having a straight line dimension can be made.

10. An optical system comprising an objective for focusing radiant energy to form an image having a curved field, said objective having a concave mirror and a pair of meniscus lenses disposed along the central axis of the objective for directing radiant energy toward said mirror, the concave surface of each of the lenses being in a facing relationship with one another, said pair of meniscus lenses correcting the spherical aberration of said mirror; means for converting the radiant energy of a portion of the curved field into an additional image having a substantially flat field, the additional image being substantially parallel to a plane tangential to the image; a focal plane shutter disposed adjacent said converting means for rejecting a portion of the radiant energy focused by said converting means; and means for moving said converting means and said focal plane shutter to scan each of the additional images formed thereby along a focal surface extending along a line substantially parallel to the curvature of the image, whereby a record of the additional images having a straight line dimension can be made.

11. An optical system comprising an objective for focusing radiant energy to form a first image having a curved field, said objective having a concave mirror and means for correcting the spherical aberration of said concave mirror; means for converting the radiant energy of a portion of the curved field into an additional image having a substantially flat field and being substantially parallel to a plane tangential to the first image; means adjacent said converting means for rejecting a portion of the radiant energy being focused by said converting means to improve the focus of the additional image; and means for moving said converting means and said rejecting means to scan the curved field and continuously form additional images defining a curved focal surface substantially flat in one direction, whereby a record of the additional images having a straight line dimension can be made.

12. An optical system comprising an objective for focusing radiant energy to form an image having a curved field, said objective having a concave mirror, a pair of meniscus lenses disposed along the central axis of the objective for directing radiant energy toward said mirror with the concave surface of each of the lenses being in a facing relationship with one another, and an aspheric corrector plate positioned between said pair of meniscus lenses; means for converting the radiant energy of a portion of the curved field into an additional image having a substantially flat field, the additional image being substantially parallel to a place tangential to the image; a focal plane shutter disposed adjacent said converting means for rejecting a portion of the radiant energy being focused by said converting means to improve the focus of the additional image; and means for moving said converting means and said focal plane shutter to scan each of the additional images along a focal surface extending along a line substantially parallel to the curvature of the image, whereby a record of the additional images having a straight line dimension can be made.

13. An optical system comprising an objective for focusing radiant energy to form an image having a curved field, said objective having a concave mirror, a pair of meniscus lenses disposed along the central axis of the objective for directing radiant energy toward said mirror with the concave surface of each of the lenses being in a facing relationship with one another, and an aspheric corrector plate positioned between said pair of meniscus lenses, a stop disposed adjacent said objective, means for converting the radiant energy of a portion of the curved field into an additional image having a substantially flat field, the additional image being substantially parallel to a plane tangential to the image, a focal plane shutter disposed adjacent said converting means for rejecting a portion of the radiant energy being focused by said converting means to improve the focus of the additional image, and means for moving said converting means and said focal plane shutter to scan each of the additional images along a focal surface extending along a line substantially parallel to the curvature of the image, whereby a record of the additional images having a straight line dimension can be made.

14. An optical ssytem comprising an objective for focusing radiant energy to form a first image having a curved field, said objective including a ball lens having point symmetry over substantially 180°, means for converting the radiant energy of a portion of the curved field into an additional image having a substantially flat field and being substantially parallel to a plane tangential to the first image, and means for moving said converting means to scan the curved field and continuously form additional images defining a curved focal surface extending along a line substantially parallel to the curvature of the first image, whereby a record of the additional images having a straight line dimension can be made.

15. An optical system comprising an objective for focusing radiant energy to form an image having a curved field, said objective including a ball lens having a pair of hemispherical meniscus lenses disposed along the central axis of the objective with the concave surface of each of the lenses being in a facing relationship with one another, each of said meniscus lenses having a hemispherical lens disposed within the concave portion thereof in a mating relationship, means for converting the radiant energy of a portion of the curved field into an additional image having a substantially flat field, the additional image being substantially parallel to a plane tangential to the image, means for rejecting the remaining portion of the radiant energy to improve the focus of the additional image, and means for moving said converting means and said rejecting means to scan each of the additional images formed thereby along a focal surface extending along a line substantially parallel to the curvature of the image, whereby a record of the additional images having a straight line dimension can be made.

16. An optical system comprising an objective for focusing radiant energy to form an image having a curved field, said objective including a ball lens having a pair of hemispherical meniscus lenses disposed along the central axis of the objective with the concave surface of each of the lenses being in a facing relationship with one another, each of said meniscus lenses having a hemispherical lens disposed within the concave portion thereof in a mating relationship, means for converting the radiant energy of a portion of the curved field into an additional image having a substantially flat field, the additional image being substantially parallel to a plane tangential to the image, a focal plane shutter for rejecting the remaining portion of the radiant energy to improve the focus of the additional image, and means for moving said converting means and said shutter to scan each of the additional images formed thereby along a cylindrical focal surface extending along a line substantially parallel to the curvature of the image, whereby a record of the additional images can be made.

17. An optical system comprising an objective for focusing radiant energy to form an image having a curved field, said objective including a ball lens having a pair of hemispherical meniscus lenses disposed along the central axis of the objective with the concave surface of each of the lenses being in a facing relationship with one another, each of said meniscus lenses having a hemispherical lens disposed within the concave portion thereof in a mating relationship, a stop disposed adjacent said ball lens, means for converting the radiant energy of a portion of the curved field into an additional image having a substantially flat field, the additional image being substantially parallel to a plane tangential to the image, a focal plane shutter for rejecting the remaining portion of the radiant energy to improve the focus of the additional image, and means for moving said converting means and said shutter to scan each of the additional images formed thereby along a focal surface extending along a line substantially parallel to the curvature of the image, whereby a record of the additional images having a straight line dimension can be made.

18. An optical system having a wide field comprising an objective for focusing radiant energy to form an image having a curved field, said objective having a concave mirror elongated in the direction of maximum field, a pair of meniscus lenses disposed along the central axis of the objective for directing radiant energy toward said mirror with the concave surface of each of the lenses being in a facing relationship with one another, and an aspheric corrector plate positioned between said pair of meniscus lenses, means for converting the radiant energy of a portion of the curved field into an additional image having a substantially flat field, the additional image being substantially parallel to a plane tangential to the image, a focal plane shutter disposed adjacent said converting means for rejecting a portion of the radiant energy being focused by said converting means to improve the focus of the additional image, said shutter having a slit opening with the longitudinal axis thereof extending at right angles to the longer axis of said elongated mirror, and means for moving said converting means and said focal plane shutter to scan each of the additional images along a focal surface extending along a line substantially parallel to the curvature of the image, whereby a record of the additional images having a straight line dimension can be made.

19. An optical system comprising an objective including a curved mirror for focusing radiant energy to form a first image having a curved field, means for correcting the aberration of said curved mirror, means for converting the radiant energy of a portion of the radiant energy being focused by said mirror into an additional image having a substantially flat field and being substantially parallel to a plane tangential to the first image, and means for moving said correcting means and said converting means to scan the curved field and continuously form additional images defining a curved focal surface extending along a line substantially parallel to the curvature of the image, whereby the moving of said correcting means with said converting means enables the symmetry of the optical system to be maintained during scanning.

20. An optical system comprising an objective for focusing radiant energy to form a first image having a curved field, said objective having a concave mirror, means for correcting the aberration of said concave mirror, means for converting the radiant energy of a portion of the curved field into an additional image having a substantially flat field and being substantially parallel to a plane tangential to the first image, means adjacent said converting means for rejecting a portion of the radiant energy being focused by said converting means to improve the focus of the additional image, and means for moving said correcting means, said converting means and said rejecting means to scan the curved field and continuously form additional images defining a curved focal surface substantially flat in one direction, whereby the moving of said correcting means with said converting means and said rejecting means enables the symmetry of the optical system to be maintained during scanning.

21. A camera with a wide field of view comprising means for focusing radiant energy to form a first image having a curved field, means for converting the radiant energy of a portion of the curved field into an additional image having a substantially flat field and being substantially parallel to a plane tangential to the first image, means for moving said converting means to scan the curved field and continuously form additional images defining a curved focal surface extending along a line substantially parallel to the curvature of the first image, and means for mounting photographic film along said focal surface, whereby a photographic record of the additional images having a straight line dimension can be made.

22. A camera with a wide field of view comprising a curved mirror for focusing radiant energy to form a first image having a curved field, means for converting the radiant energy of a portion of the radiant energy being focused by said mirror into an additional image having a substantially flat field and being substantially parallel to a plane tangential to the first image, means for moving said converting means to scan the curved field and continuously form additional images defining a curved focal surface substantially flat in one direction, and means for mounting photographic film along the focal surface, whereby a photographic record of the additional images having a straight line dimension can be made.

23. A camera with a wide field of view comprising means for focusing radiant energy to form a first image having a substantially spherical field, means for converting the radiant energy of a portion of the spherical field into an additional image having a substantially flat field and being substantially parallel to a plane tangential to the first image, and means for moving said converting means to scan the curved field and continuously form a cylindrical scanning image defining a cylindrical focal surface, the center axis of said cylindrical focal surface passing through the center of spherical curvature of the first image, and means for mounting a strip of photographic film along the cylindrical focal surface, whereby a strip photographic record of the scanning image can be made.

24. A camera with a wide field of view comprising an objective for focusing radiant energy to form a first image having a curved field, said objective having a concave mirror, and means for correcting the aberration of said concave mirror; means for converting the radiant energy of a portion of the curved field into an additional image having a substantially flat field and being substantially parallel to a plane tangential to the first image; a focal plane shutter disposed adjacent said converting means for rejecting a portion of the radiant energy being focused by said converting means to improve the focus of the additional image; means for moving said converting means and said focal plane shutter to scan the curved field and continuously form a scanning image defining a substantially cylindrical focal surface; and means for mounting a strip of photographic film along the cylindrical focal surface, whereby a strip photographic record of the scanning image can be made.

25. A camera with a wide field of view comprising an objective for focusing radiant energy to form an image having a curved field, said objective having a concave mirror, a pair of meniscus lenses disposed along the central axis of the objective for directing radiant energy toward said mirror with the concave surface of each of the lenses being in a facing relationship with one another, and an aspheric corrector plate positioned between said pair of meniscus lenses, means for converting the radiant energy of a portion of the curved field into and additional image having a substantially flat field, the additional image being substantially parallel to a plane tangential to the image, a focal plane shutter disposed adjacent said converting means for rejecting a portion of the radiant energy being focused by said converting means to improve the focus of the additional image, means for moving said converting means and said focal plane shutter to scan each of the additional images along a cylindrical focal surface extending along a line substantially parallel to the curvature of the image, and means for mounting a strip of photographic film along the cylindrical focal surface, whereby a strip photographic record of the additional images can be made.

26. A camera having a wide field of view comprising an objective for focusing radiant energy to form a first image having a curved field, said objective including a ball lens means for converting the radiant energy of a portion of the curved field into an additional image having a substantially flat field and being substantially parallel to a plane tangential to the first image, a focal plane shutter for rejecting the remaining portion of the radiant energy to improve the focus of the additional image, means for moving said converting means and said rejecting means to scan the curved field and continuously form additional images defining a substantially cylindrical focal surface, and means for mounting a strip of photographic film along the cylindrical focal surface, whereby a strip photographic record of the additional images can be made.

27. A camera having a wide field of view comprising an objective for focusing radiant energy to form an image having a curved field, said objective including a ball lens having a pair of hemispherical meniscus lenses disposed along the central axis of the objective with the concave surface of each of the lenses being in a facing relationship with one another, each of said meniscus lenses having a hemispherical lens disposed within the concave portion thereof in a mating relationship, means for converting the radiant energy of a portion of the curved field into an additional image having a substantially flat field, the additional image being substantially parallel to a plane tangential to the image, a focal plane shutter for rejecting the remaining portion of the radiant energy to improve the focus of the additional image, means for moving said converting means and said rejecting means to scan each of the additional images formed thereby along a focal surface extending along a line substantially parallel to the curvature of the image, and a transparent cylindrical platen extending along the focal surface for supporting a strip of photographic film along the focal surface, whereby a record of the additional images can be made.

28. A camera with a wide field of view comprising an objective for focusing radiant energy to form a first image having a curved field, said objective having a concave mirror and means for correcting the aberration of said concave mirror; means for converting the radiant energy of a portion of the curved field into an additional image having a substantially flat field and being substantially parallel to a plane tangential to the first image; a focal plane shutter disposed adjacent said converting means for rejecting a portion of the radiant energy being focused by said converting means to improve the focus of the additional image; means for moving said correcting means, said converting means and said focal plane shutter to scan the curved field and continuously form additional images along a cylindrical focal surface; and means for mounting a strip of photographic film along the cylindrical focal surface, whereby the symmetry of the objective can be maintained during scanning for producing a strip photographic record of the additional images.

29. An optical system comprising:
means for focusing radiant energy to form a first image having a curved field;
lens means for flattening a portion of the curved field; and
means for moving said lens means to scan the curved field and form a second curved image, said second image being substantially flat in one direction, whereby a record of the second image having a straight line dimension can be made.

30. An optical system comprising:
an objective for focusing radiant energy to form a first image having a curved field; and
means for scanning said curved field with a field flattening lens to form a second image defining a curved focal surface substantially flat in one direction, whereby a record of the second image having a straight line dimension can be made.

31. An optical system according to claim 30 wherein said objective includes a curved mirror.

32. An optical system comprising:
an objective for forming a first image having a substantially spherical field; and
means for scanning said spherical field with a field flattening lens to form a second image having a substantially cylindrical field, said cylindrical field having a central axis that passes through the center of curvature of the spherical field of the first image, whereby a cylindrical record of the second image can be made.

33. An optical system according to claim 32 wherein said objective includes a substantially spherical concave mirror.

References Cited

UNITED STATES PATENTS 3,141,397 7/1964 McNeil _____ 95—15
3,151,524 10/1964 Bouwers _____ 88—57

JOHN M. HORAN, Primary Examiner

U.S. Cl. X.R.

350—22